Feb. 13, 1945. W. BROWN 2,369,527
ADJUSTABLE AND REMOVABLE MOUNTING GUARD FOR RIMLESS EYEGLASSES
Filed Oct. 9, 1941
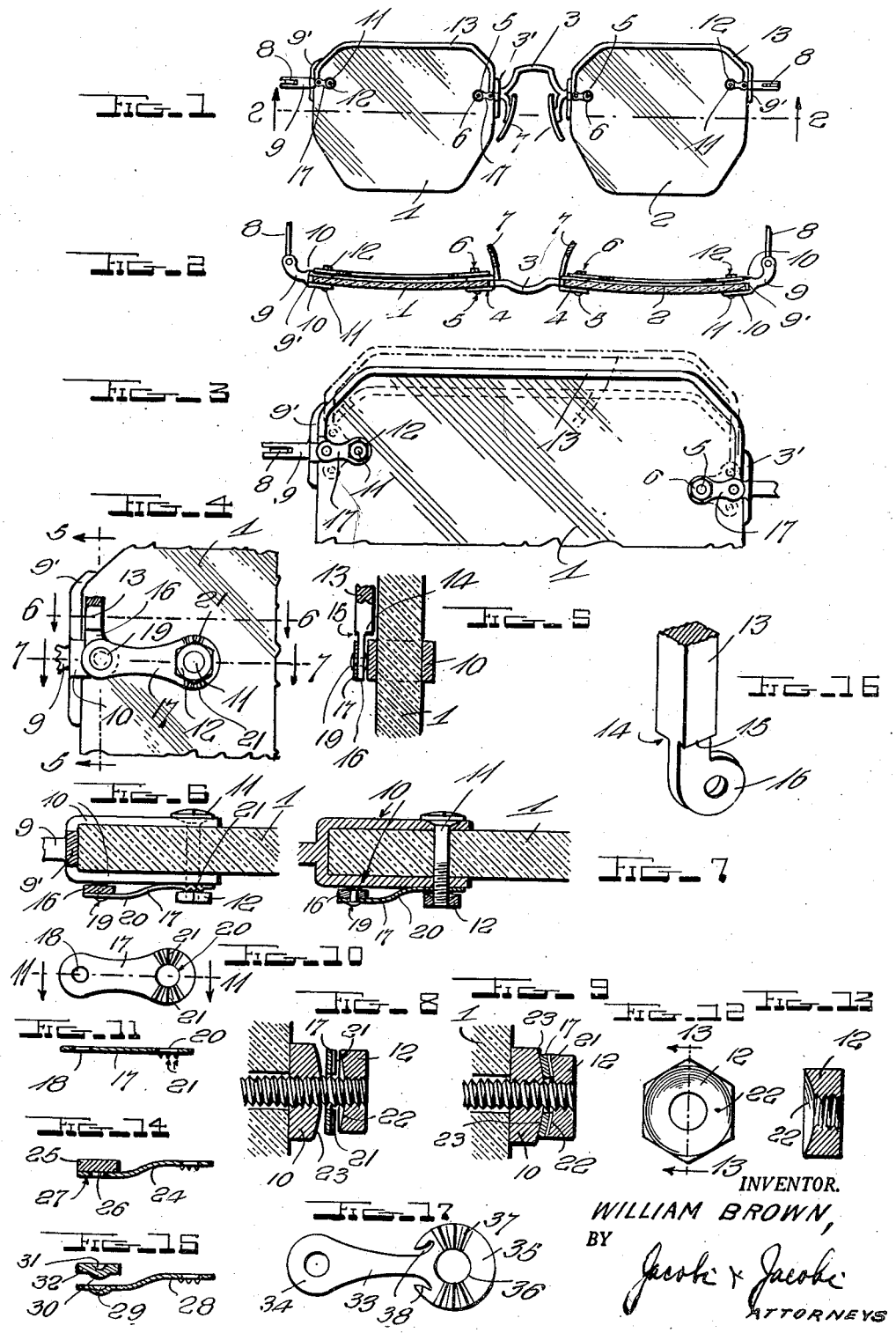
INVENTOR.
WILLIAM BROWN,
BY
Jacobi & Jacobi
ATTORNEYS Patented Feb. 13, 1945

2,369,527

UNITED STATES PATENT OFFICE 2,369,527

ADJUSTABLE AND REMOVABLE MOUNTING GUARD FOR RIMLESS EYEGLASSES

William Brown, Wilkes-Barre, Pa., assignor to Shock Proof Lens Guard, Inc., Kingston, Pa., a corporation of Pennsylvania Application October 9, 1941, Serial No. 414,360

4 Claims. (Cl. 88—41)

This invention relates to improvements in attachments for rimless eyeglasses (the application being a continuation in part of my Patent No. 2,344,230, issued March 14, 1944), and more particularly to a guard for the mounting of such type glasses, the primary object being to provide an adjustable and removable mounting guard for rimless eyeglasses which will positively secure the mountings in position with respect to the lenses without applying undue pressure on said lenses.

A further object of the invention resides in providing a guard for the mountings of rimless eyeglasses wherein there is included a specific locking means for the nasal and temporal lens-mountings, with means connecting said locking means on each lens following the contour of the periphery of the lens without contacting said lens.

A further object of the invention resides in the provision of a guard which will prevent the mountings on rimless eyeglasses from becoming loose and wabbly and which, when secured in position, will firmly retain the mountings in position without direct pressure on the lenses.

A still further object of the invention resides in providing a guard as aforesaid, which, while preventing the mountings from loosening, will, at the same time, permit normal flexibility of the temples in any manner and normal flexibility of the complete pair of glasses.

A further object of the invention resides in the provision of an adjustable and removable mounting guard which, when secured in position, will have substantially a hinge-like connection with the mountings of rimless glasses, with means for securely locking the guard in various adjusted positions with respect to said mountings.

A still further object resides in the provision of an adjustable and removable mounting guard capable of application to lenses of various shapes, including oval, octagonal or other shaped lenses and which when applied will not only have a useful function but also add to the ornamentality of the glasses.

A still further object resides in the provision of a mounting guard which will enable a pair of rimless glasses to be placed edgewise on an object without danger of scratching or otherwise injuring the lenses but which will also enable the wearer to apply what is known as slip-over lens attachments over the guard without danger of chipping the lenses.

Still another object of the invention resides in providing a guard which, while protecting the lenses, will secure the mountings in place against casual disengagement from the lenses, thus preventing the annoyance of having wabbly lenses in the frames from time to time, and which will tend also to prevent the cracking of the lenses, both in the application of the guard to use by the mechanic and after the same has been applied and the eyeglasses placed in use by the wearer.

Still another object of the invention resides in providing a device which is comparatively simple, durable in construction, inexpensive to manufacture and one which will prove very efficient and useful in operation.

With these and numerous other objects in view, my invention consists in the novel features of construction, combination and arrangement of parts as will be hereinafter referred to and more particularly pointed out in the specification and claims.

In the accompanying drawing forming a part of this application,

Figure 1 is an elevational view of a pair of eyeglasses having octagonal-shaped lenses and embodying my improved mounting guard, viewing the same from the inside, with the temples in section;

Figure 2 is a horizontal section therethrough, as seen on the line 2—2 of Figure 1;

Figure 3 is an enlarged inside elevational view of one of the lenses with my adjustable and removable mounting guard attached thereto, showing in dotted lines various adjustable positions of the guard, the temple being shown in section;

Figure 4 is an enlarged detailed elevation of a fragment of a lens with the guard applied, parts being broken away and parts being shown in section;

Figure 5 is a vertical section therethrough as seen on the line 5—5 of Figure 4;

Figure 6 is a horizontal section therethrough as seen on the line 6—6 of Figure 4, parts being shown in elevation;

Figure 7 is a similar view as seen on the line 7—7 of Figure 4;

Figure 8 is an enlarged detailed section through a lens, a portion of a mounting, link guard and securing nut with the parts about to be secured in position;

Figure 9 is a similar view with the parts secured in position with respect to one another, showing particularly the bending of the link guard over the curved portion of the mounting strap under the action of the concave securing nut;

Figure 10 is an elevational view of the link guard removed, showing the serrations therein;

Figure 11 is a horizontal section therethrough as seen on the line 11—11 of Figure 10;

Figure 12 is an inside elevational view of the concave nut;

Figure 13 is a vertical section therethrough as seen on the line 13—13 of Figure 12;

Figure 14 is a vertical section showing a slightly modified form of connection between the bracing bar and the link guard;

Figure 15 is a similar view showing a further modified form of a connection, with the elements separated;

Figure 16 is an enlarged fragmentary perspective view of the one end of the bracing bar, with parts being shown in section, and Figure 17 is an elevational view of a modified form of link guard.

It is a well known fact that in the daily use of rimless eyeglasses, or even in the use thereof by those who require glasses on certain occasions, the mountings become loose and wabbly, thereby creating a noticeable movement of the lenses with respect to said mountings. When lenses are loose and wabbly, same are thrown off their normal axes, thus changing the correction and making same uncomfortable as well as injurious to the wearer. Obviously, the effect of lenses so distorted will impair the vision of the wearer.

My invention contemplates the provision of means to eliminate the difficulties heretofore encountered by the use of a floating connection between the mountings of each lens which, when secured firmly in place, will positively and permanently lock said mountings in their properly adjusted positions with respect to the lenses against casual disengagement.

I am appreciative of the fact that various so-called bars or guards or braces have been used over or adjacent the upper peripheral edges of rimless eyeglasses for purposes of ornamentality, protection of the edges of the lenses and for various other alleged purposes, but none of such devices have heretofore been produced for accomplishing the primary purposes of my invention, that is, to secure and guard the mountings on rimless eyeglasses against causal disengagement from the lenses to prevent loosening of the latter. Nor has there been provided heretofore a floating guard of the type provided herein which is capable of ready adjustment so as to correctly fit the lenses under all conditions.

When lenses are ground inaccurately through error and the mounting openings therein inaccurately drilled, difficulty is encountered in applying an ordinary brace or bar to rimless glasses, but the provision of a floating or adjustable guard, such as I have invented, enables me to apply the guard and readily adjust the same to correctly fit the lenses under such conditions. Moreover, it has not been possible heretofore to apply a brace or guard to the rimless eyeglasses wherein the lenses are of the octagonal shape, but my invention enables me to apply the guard to such shapes of lenses, due to the floating and adjustable connections constituting an essential part of the invention.

In the mounting of the rimless eyeglasses, the mechanics or workmen in the shop endeavor to secure the lenses in place without strain to protect the same against cracking. In fact, special instruments are provided to detect any undue strain on the lenses when mounted, but it has been found that when strain is applied to the lenses through the securing of the mountings, nothing will prevent the cracking of the lenses.

It is a purpose of my invention to provide a mounting guard of such a construction and adapted for such application as will prevent undue strain being applied to the lenses, regardless of how securely the guard is applied to the mounting by the shop mechanic.

It is, likewise, the purpose of my invention to so secure the guard in position when first applied by the mechanic at the optical shop, and without strain on the lenses, that same may be retained in position indefinitely, a serrated connection being provided which acts substantially as a lock washer for the nut applied to the screw of the mounting to secure the same against casual disengagement. There being no direct pressure or strain on the lenses, through my improved guard when applied to use, the dangers of cracking lenses, through careless handling of the glasses, or even through application of undue strain when mounting the lenses, will be substantially minimized, if not actually eliminated.

In describing the invention, I shall refer to the drawing, in which similar reference characters designate corresponding parts throughout the several views and in which the numerals 1 and 2 designate, respectively, lenses in a pair of rimless eyeglasses, these lenses being shown as of the octagonal shape, although it is to be understood that the lenses may be round, oval or any other desired shape or design, since my invention is applicable to lenses of any shape, whatsoever. These lenses are connected by the nose piece or bridge 3 which may be of the conventional type, or otherwise, same having the pairs of straps 4 straddling the inner opposed ends of the lenses and secured to the latter by means of the screws 5 and the nuts 6. While I have shown a bridge in which a pair of straps straddles the lens, it will be understood, of course, that there may be utilized, with equally good effect, so far as my invention is concerned, a bridge in which only one, or the inside strap, is used in connection with the lens. The numeral 7 designates the nose guard which may be of the conventional or any desired style or design.

My invention is particularly applicable to rimless eyeglasses of the spectacle type, although not necessarily limited to this type, and in the drawing I have shown the conventional temples 8 pivotally carried by the temple supports 9. These temple supports are disclosed as having a pair of straps 10 straddling the outer opposed ends of the lenses 1 and are secured in place through the medium of the screws, 11, and nuts 12. While I have shown the type of temple supports in which a pair of arms or straps straddle the lenses, it is, of course, to be understood that supports may be used in which only a single inside strap is provided, as my invention is equally well adapted for use in connection with such a support, and particularly is this true when exceptionally thick or exceptionally thin lenses are utilized, at which times double strap mountings are impractical.

The mountings for the bridge or nose piece 3 and the mountings for the temple supports are respectively provided with the side straps 3' and 9' which are of the conventional type. Whereas, various types of side straps have been heretofore provided to prevent loosening of the mountings, such as spring guards, cork or rubber lined straps, I do not find it necessary to utilize any such constructions since the conventional type side straps will meet all requirements when my invention is employed.

In carrying out my invention, I provide each lens with a guard which comprises a bracing bar 13, preferably formed of a soft flexible light metal which may be readily bent to conform to the shape or contour of any lens to which it is adapted to be applied, and floatingly or hingedly mount the same in connection with the mounting straps of the nasal and temple supports. While I have shown this bracing bar 13 in the drawing to be substantially rectangular in cross-section, I do not wish to be particularly limited to this shape as same may be round, oval or any other design in cross-section without affecting the invention. Likewise, this bracing bar is adapted to be mounted so as to conform to the upper peripheral edge of each lens and lie just rearward thereof, although same may be designed to fit over the peripheral edge of each lens without departing from the invention.

As shown in Figure 16 of the drawing, the free ends of the bracing bar 13 are offset from opposite faces thereof to form on one face a wide shoulder 14 and on the other face a narrow shoulder 15, leaving a reduced portion 16 which is designed to form an ear or the like, for a purpose to be hereinafter and more particularly set forth.

As aforesaid, this bracing bar 13 is floatingly or hingedly supported in position and acts as a brace between the nasal and temple supports, so that when these supports are mounted on the lenses, same will be secure in position as against casual disengagement. In carrying out my invention, therefore, I provide for each bracing bar a pair of link guards 17, the one end of each of which is provided with an opening 18 through the medium of which same may be swivelly or hingedly engaged with the ear 16 at the free end of the bar 13. This swivel connection is designated by the numeral 19, as clearly shown in Figures 6 and 7 of the drawing and the link guard is applied to the face of the ear 16 immediately adjacent the short or narrow shoulder 15. Each link guard 17, adjacent the opposite end thereof, is provided with an opening 20, so that the same may be applied to the free ends of the screws 5 and 11 which secure, respectively, the nasal and temple supports to the lenses. Incidentally, the screws 5 and 11 are of the standard length, the same engaging the threaded openings in the straps 4 and 10, but are of such length as to permit the link guards to be applied thereto between said straps and the nuts applied to the ends of said screws. The offset forming the shoulder 15 in the one face of the ends of the bar 13 permits the link guards to fit thereon and be substantially flush with the one face of said bracing bar. The opposite offset forming the wide shoulder 14 is provided to enable the bracing bar to operate over the straps of the nasal and temple supports and at the same time permit the bracing bar to overlie the face of the lens in very close proximity thereto. Due to the thicknesses of the metal parts on the mountings, each of the link guards 17 is slightly bent intermediate of its ends, as shown at 20.

The one face of each link guard is provided with radial serrations 21 radiating from the opening 20 and the nuts 6 and 12 have the inner faces thereof concaved as shown at 22. Thus, when these nuts are turned home, after the adjustment has been made of the bracing bar with respect to the lens, the peripheral edges of the concaved inner face will engage the serrated portions of the link guards 17 and bite thereagainst, but at the same time the link guard will be bent in arcuate fashion, as shown in Figure 9 of the drawing, to conform to the curved face 23 of the straps 4 and 10 of the nasal and temple supports. The link guards 17 are formed of very thin springy metal and through the medium of the construction shown and described, same will constitute substantially lock washers for the nuts 6 and 12 when the latter are turned home in the position shown in Figure 9 of the drawing.

In mounting the guards, the same are applied to the inner faces of the lenses, with the bracing bars 13 adjacent the upper edges of said lenses, with which the same are adapted to conform. The link guards are applied to the screws 5 and 11 and the nuts 6 and 12 are turned lightly on the screws to a neutral position. The bracing bars are then adjusted with the fingers to the proper position to conform to the outline of the upper peripheral edges of the lenses, and this is accomplished quite readily in view of the floating or hinged connections between the ends of the bracing bar and the straps of the mountings. The nuts are then turned home and the concaved inner faces of said nuts will cause the adjacent portions of the link guards, as aforesaid, to bend in conformity to the straps of the mountings, as clearly shown in Figure 9 of the drawing, and the serrations in the link guards will so engage the nuts as to secure the latter in the position to which the same have been turned, as against casual displacement.

Thus, when the nuts are secured in place, the link guards act substantially as lock washers for said nuts and the nuts are prevented from becoming loose by casual displacement. At the same time, the bracing bars 13 hold these link guards 17 in their adjusted positions, the link guard at the nasal mounting being connected firmly to the link guard at the temple mounting. Should it occur, which is not likely, that one of the mountings become loose, there would be no wobble or loose connections which would affect the vision of the wearer because of the tight connection of such mounting with the mounting at the opposite end of the lens. Thus, it will be seen when the nuts are secured in place, they not only secure the respective mountings against casual disengagement, but prevent the mountings from becoming loose and wobbly at both ends of each run and the dangers as heretofore described incident to the use of glasses with loose lenses will be avoided.

In Figure 14 of the drawing, I have shown a slight modification of the invention wherein a link guard 24, similar to the link guard 17, is provided but its connection with the lower end 25 of the bracing bar is different from the form heretofore described. In this instance, the end of the bracing bar 25 is provided with a stud 26 which fits pivotally in the opening 27 at one end of the link guard 24. Thus, a pivotal or swivelled connection is provided with the elements, but said elements are readily separable, when and if desired.

In Figure 15 I have shown a still further modification of the invention, wherein a link guard 28 is provided somewhat similar to the link guard 17, except that in lieu of an opening in the one end, a depression 29 is provided therein adapted to receive a projection 30 formed by making a depression 31 in the end of a bracing bar 32. This provides a swivelled connection between the elements but also affords ready separation of the elements when and if desired.

In Figure 17 of the drawing, I have shown a slightly modified form of link guard 33. In this form of the invention, the opening 34 is provided in one end thereof for swivelled connection with the lower end of a bracing bar. The head 35 of this link guard is provided with an opening 36 from which radiate the serrations 37, as in the preferred form of the invention heretofore described. Since it is important that this head of the link guard bend freely over the arcuate portion of the straps of the nasal and temple supports, under action of the concaved nut, I have provided this form of link guard with arcuate slots at the junction of the head 35 with the body portion thereof. Obviously, this permits a more ready bending of the metal when the nut is turned home. Such a construction will facilitate the bending or distorting of this portion of the link strap to aid in securing the mountings in position when positively set with respect to the lenses.

It will be seen from this construction as herein presented that a guard may be readily applied to each lens of a pair of rimless eyeglasses and quickly and readily adjusted to any position with respect thereto and firmly secured in position, without direct pressure on the lenses, since the screws are threadedly engaged with the mounting straps and the nuts turned tightly home against the link guards which in turn are distortedly engaged against said mounting straps. It will further be seen that the nuts will be prevented from casual displacement and, likewise, the bracing bars will cause the link guards to be secured firmly in their adjusted positions, at the same time constituting a guard for the peripheral edges of the lenses. With direct pressure on the lenses eliminated, the danger of cracking or otherwise injuring the lenses is thus avoided.

It will be seen that my invention is capable of application to use on glasses wherein the mountings are applied to the lenses either at the centers thereof, or above the centers, or on "full view" mountings, or a combination of the same. Furthermore, this particular invention may be applied to new or old rimless eyeglasses and in view of the simple construction and ready application of the same to use thereon, the device will not require the services of an expert mechanic for the mounting thereof, same being capable of mounting by any shop mechanic or salesman connected with the optical trade.

It will be seen that the many difficulties encountered by others in the use of bars or bracing devices which brace up the entire pair of glasses, without providing for ready adjustment thereof, will be avoided in the use of my invention.

While other guards, which are secured, without possibility of adjustment, to the mountings of the lenses would require the entire removal from the glasses in order to conform the same to the peripheries of lenses, due to inaccurate drilling of holes, etc., it will be seen that with my invention, it is only necessary for the shop mechanic or anyone experienced in the trade, to slightly loosen the nuts on the screws, and readily adjust the bracing bar to conform to the contour of the lenses by and through the adjustment of the link guards in one direction or the other, the swivelled connections permitting this to be readily accomplished. When the adjustment has been made, the nuts being turned home will positively secure the mountings in the properly adjusted positions.

From the foregoing description of the construction of my improved mounting guard for rimless glasses, the application of the same to use will be readily understood and it will be seen that I have provided a comparatively simple, inexpensive and efficient means for carrying out the various objects of this invention.

While I have particularly described the elements best adapted to perform the functions set forth, it is obvious that various changes in form, proportion and in the minor details of construction may be resorted to, without departing from the spirit or sacrificing any of the principles of the invention.

I claim:

1. In eyeglass construction, a pair of lenses, a bridge member, temple supports, said bridge member and temple supports having straps thereon respectively overlapping the inner and outer end portions of the lenses, the outer faces of said straps being curved screws extending through said straps and lenses, brace bars for extension along the margins respectively of said lenses between the bridge member and temple supports, link members formed of resilient material having their outer ends pivotally connected to the ends of said brace bar for vertical adjustment about outer horizontal axes, the aforesaid screws extending beyond the aforesaid straps and through the inner ends of the link members pivotally mounting the latter for vertical tilting adjustment about inner horizontal axes parallel to said outer axes, and means applicable to the ends of said screws for retaining the elements together and provided with means for cooperating with the curved faces of said straps for simultaneously distorting inner end portions of said link members over said straps to securely lock the link members and correspondingly said brace bars in various adjusted positions and against casual displacement.

2. In eyeglass construction, a pair of lenses, a bridge member having lens engaging straps, temple supports having lens engaging straps, the outer faces of said straps being curved, elements projected through said straps and lenses to support one with respect to the other, brace bars for extension along the margins respectively of said lenses between said bridge member and temple supports, link members formed of resilient pliable material having their outer ends pivotally connected to the ends of said brace bar for vertical adjustment about outer horizontal axes, the aforesaid elements extending beyond said straps and through the inner end portions of said link members pivotally supporting the latter for vertical tilting adjustment about inner horizontal axes parallel to said outer axes, and means engaging the ends of said elements for securing the straps, lenses and link members together, said last mentioned means being provided with means for cooperation with the curved faces of said straps for causing a distortion of inner end portions of said links over said straps to securely lock said link members and correspondingly said brace bar in adjusted positions against casual displacement when effectively applied.

3. In eyeglass construction, a pair of lenses, a bridge member, temple supports, said bridge member and temple supports having straps thereon respectively overlapping the inner and outer end portions of the lenses, screws extending through said straps and lenses, brace bars for extension along the margins respectively of said lenses between the bridge member and temple supports, link members formed of resilient material having their outer ends pivotally connected to the ends of said brace bar for vertical adjustment about outer horizontal axes, the aforesaid screws extending beyond the aforesaid straps and through the inner ends of the link members pivotally mounting the latter for vertical tilting adjustment about inner horizontal axes parallel to said outer axes, and nuts applicable to the free ends of said screws for securing the straps, lenses and link members together, the adjacent faces of said nuts and straps being provided with means cooperating with each other to cause a distortion of inner end portions of said links over said straps to securely lock said link members and correspondingly said brace bar in adjusted positions against casual displacement when said nuts are turned home.

4. In eyeglass construction, a pair of lenses, a bridge member having lens engaging straps, temple supports having lens engaging straps, screws extending through said straps and lenses to support one with respect to the other, brace bars for extension along the margins respectively of said lenses between the bridge member and temple supports, link members formed of resilient pliable material having their outer ends pivotally connected to the ends of said brace bar for vertical adjustment about outer horizontal axes, said screws extending beyond the aforesaid straps and through the inner ends of the link members pivotally supporting the latter for vertical tilting adjustment about inner horizontal axes parallel to said outer axes, portions of the inner ends of said link members being serrated, and nuts applicable to the free ends of said screws for securing the straps, lenses and link members together, the adjacent faces of said nuts and straps being provided with means cooperating with each other to cause a distortion of the serrated portions of said link members over said straps to securely lock said link members and correspondingly said brace bar in adjusted positions against casual displacement when said nuts are turned home.

WILLIAM BROWN.